United States Patent [19]
Mita et al.

[11] Patent Number: 5,872,412
[45] Date of Patent: *Feb. 16, 1999

[54] MOTOR WITH SPEED REDUCER HAVING REVERSAL PREVENTION MECHANISM

[75] Inventors: Masaki Mita, Ashikaga; Hiroshi Mori, Kiryu, both of Japan

[73] Assignee: Mitsuba Corporation, Kiryu, Japan

[*] Notice: This patent issued on a continued prosecution application filed under 37 CFR 1.53(d), and is subject to the twenty year patent term provisions of 35 U.S.C. 154(a)(2).

[21] Appl. No.: 760,957

[22] Filed: Dec. 5, 1996

[30] Foreign Application Priority Data

Feb. 15, 1996 [JP] Japan .................... 8-052268

[51] Int. Cl.$^6$ ........................................ H02K 7/06
[52] U.S. Cl. .................. 310/83; 310/90; 310/43; 310/42
[58] Field of Search ................. 310/90, 83, 43, 310/42

[56] References Cited

U.S. PATENT DOCUMENTS 5,089,736  2/1992  Oyafuso ..................... 310/90
5,099,717  3/1992  Ochiai et al. .............. 74/606 R
5,485,044  1/1996  Mackey et al. ............. 310/90

FOREIGN PATENT DOCUMENTS 61-36476  2/1986  Japan .

*Primary Examiner*—Clayton LaBalle
*Assistant Examiner*—Timothy A. Williams
*Attorney, Agent, or Firm*—Oliff & Berridge, PLC

[57] ABSTRACT

A motor is provided with a speed reducer. The motor includes a rotatable motor shaft having an end face and a threaded portion. The speed reducer includes a gear for communicating with the threaded portion of the motor shaft. A speed reduction case encloses at least a part of the speed reducer and includes a thrust receiving portion facing the end face of the motor shaft. An end spacer is disposed between the thrust receiving portion of the speed reduction case and the end face of the motor shaft. The end spacer includes a press-fitting portion secured at the thrust receiving portion of the speed reduction case to prevent the end spacer from rotating relative to the speed reduction case. The end spacer also includes a protrusion. A thrust force applied to the motor shaft presses the end face of the motor shaft to the protrusion of the end spacer to brake the rotation of the motor shaft by friction.

20 Claims, 3 Drawing Sheets

MOTOR WITH SPEED REDUCER HAVING REVERSAL PREVENTION MECHANISM

BACKGROUND OF THE INVENTION

1. Field of the Invention

The present invention relates to a motor with a speed reducer for use with electrical equipment, and more particularly to such an apparatus having a reversal prevention mechanism use with a power window system of a car.

2. Description of the Related Art

It is known to provide a motor with a speed reducer for use with a power window system of a car. The speed reducer includes a worm gear mechanism that has a reversal prevention function so as to prevent reversal due to an external force. However, when the speed reducer is used to drive the power window system, the window can be forced open by applying a strong downward force to the window. Thus, in order to deter crime, a separate reversal prevention mechanism is provided to compliment the reversal prevention function of the worn gear mechanism. However, conventional reversal prevention mechanisms are undesirable since they include many parts and are difficult to assemble.

Therefore, Japanese Unexamined Patent Publication No. 61-36476, discloses an apparatus to brake the rotation of a motor shaft, that is integrated with a worm gear, by a frictional force generated by an end spacer. The end spacer is provided for an end face of the motor shaft. A thrust force applied to the motor shaft is communicated to the end spacer. The end spacer thereby presses and contacts the inner wall of a case (motor yoke or speed reduction case).

The yoke for supporting an end of the motor shaft is made of a very ferromagnetic metal because it must form a magnetic path. However, the speed reduction case that houses the worm gear mechanism is typically made of a lightweight resin. Therefore, a metallic plate is provided at the thrust receiving portion of the speed reduction case in order to prevent the speed reduction case from abrading due to the friction with the end spacer and from when the end spacer is forcibly brought into contact with the metallic plate.

A problem arises in that frictional heat is produced between the end spacer and the metallic plate. The frictional heat is transmitted to the metallic plate which has a heat conductivity larger than that of the plastic end spacer. Therefore, the portion of the speed reduction case to which the metallic plate is set can be softened by the frictional heat, depending on the operating condition.

Additionally, a setting hole for preventing rotation must be formed by inserting the end spacer at the front end of the motor shaft. Therefore, it is difficult to form the setting hole when the front-end diameter of the motor shaft is small, which makes assembly impossible. Thus, the industry lacks a speed reducer having a reversal prevention mechanism which is simple to manufacture and to assemble. The industry also lacks a reversal prevention mechanism which minimizes damage to the speed reduction case due to frictional heat.

SUMMARY OF THE INVENTION

It is, therefore, an object of the present invention to solve the problems identified above. Specifically, it is an object of the present invention to provide a speed reducer having a reversal prevention mechanism which is simple to manufacture and to assemble. It is also an object of the present invention to provide a speed reducer having a simple, strong, durable and reliable reversal prevention mechanism. It is another object of the present intention to provide a reversal prevention mechanism which minimizes damage to the speed reduction case due to frictional heat.

These and other objects are attained by providing a motor with speed reducer, the motor including a rotatable motor shaft having an end face and a threaded portion, the speed reducer including a gear for communicating with the threaded portion of the motor shaft. A speed reduction case encloses at least a part of the speed reducer and includes a thrust receiving portion facing the end face of the motor shaft. An end spacer is disposed between the thrust receiving portion of the speed reduction case and the end face of the motor shaft. The end spacer includes a press-fitting portion secured at the thrust receiving portion of the speed reduction case to prevent the end spacer from rotating relative to the speed reduction case. The end spacer also includes a protrusion. A thrust force applied to the motor shaft presses the end face of the motor shaft to the protrusion of the end spacer to brake the rotation of the motor shaft by friction.

In accordance with the invention described above, the frictional heat produced between the end spacer and the motor shaft is transmitted to the motor shaft which has a high heat conductivity. Therefore, transmission of the frictional heat to the speed reduction case is minimized. The speed reduction case is thereby prevented from softening. Additionally, it is unnecessary to form a setting hole for the end spacer at the front end of the motor shaft. Thus, any motor shaft with a small front-end diameter can be used.

Further objects, details and advantages of the invention will be apparent from the detailed description, when read in conjunction with the drawings.

DETALED DESCRIPTION OF THE PREFERRED EMBODIMENTS

Figure 1:
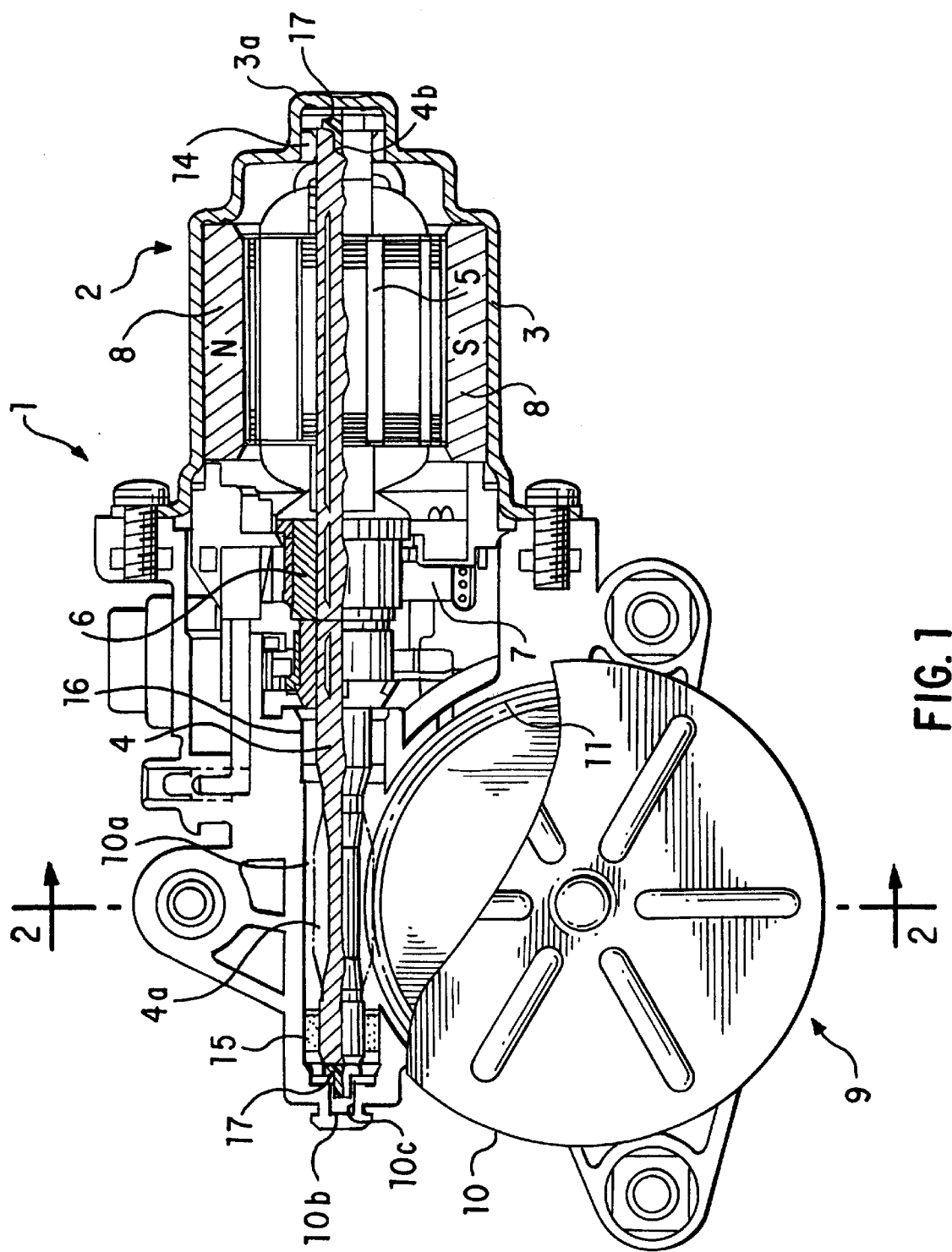
FIG. 1 is a broken away side elevational view of a motor with a speed reducer in accordance with the present invention.

FIG. 1 shows a motor 1 with a speed reducer for use with a power window system or similar apparatus. A motor section 2 of the motor 1 and speed reducer includes a motor shaft 4, rotor core 5, commutator 6, brush 7, and permanent magnet 8 provided within a yoke 3. The front end of the motor shaft 4 protrudes from the yoke 3. A worm 4a is integrally formed on the outer periphery of the motor shaft 4 along a predetermined range.

Figure 2:
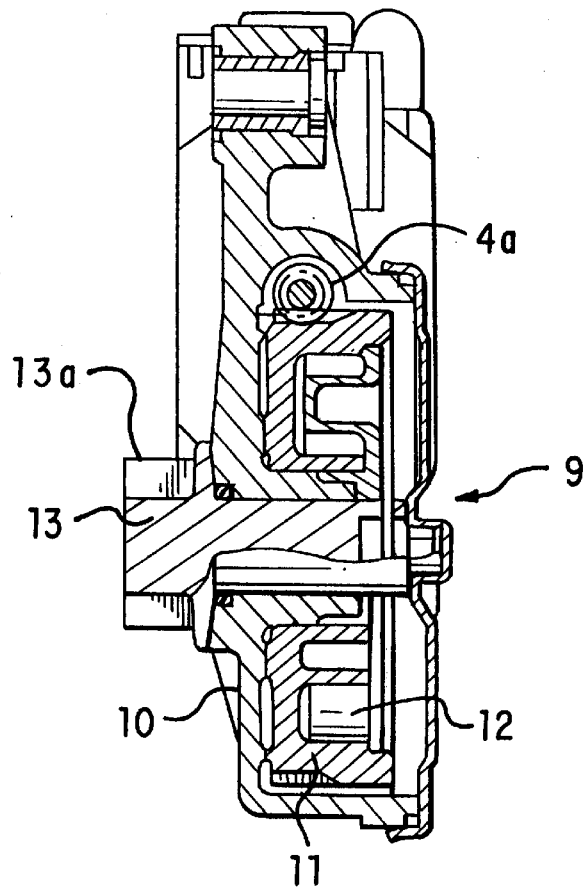
FIG. 2 is a broken away elevational view taken along plane 2—2 of FIG. 1.

A speed reducing section 9 is integrated with the motor section 2. The speed reducing section 9, as shown in FIG. 2, includes a worm wheel 11 engaged with the worm 4a, an output shaft 13 rotatably connected with the worm wheel 11 through a cushioning member 12, and an output gear 13a integrated with the output shaft 13. The speed reducing section 9 is provided within a speed reduction case 10 made of resin. The speed reduction case 10 is made of resin in order to be light-weight. Moreover, the speed reducing section 9 forcibly opens or closes a windowpane by communicating the power of the motor, reduced by the worm gear mechanism (worm 4*a* and worm wheel 11), to a windowpane opening/closing linkage (not shown) via the output gear 13*a*.

A root end of the motor shaft 4 is journaled by a bearing member 14 provided at the bottom of the yoke 3. A front end of the motor shaft 4 is journaled by bearing members 15 and 16 provided at a motor-shaft penetrating section 10*a* of the speed reduction case 10.

Figure 3:
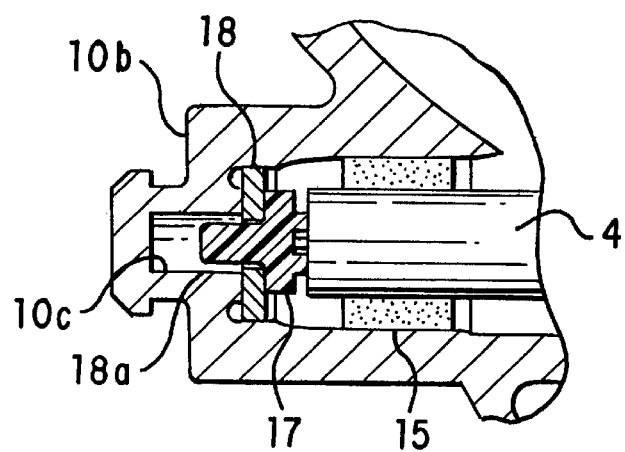
FIG. 3 is an enlarged sectional view of a portion of a set end spacer of FIG. 1.

An end spacer 17 prevents the reversal of the motor shaft 4 when the motor shaft 4 is subjected to a thrust force caused by pushing down a windowpane. An end spacer 17 is disposed between the root end face of the motor shaft 4 and a thrust receiving portion 3*a*. Another end spacer 17, as shown in FIG. 3, is disposed between the front end face of the motor shaft 4 and a thrust receiving portion 10*b* of the speed reduction case 10.

End spacers 17 are provided at both locations so that the same motor 1 and speed reducer assembly can be used for power windows at both the right and left side doors. This is necessary because the direction of a thrust force produced by pushing down a windowpane on the left side door is opposite to that of the right side door. Thus, an end spacer 17 is provided at each end face of the motor shaft 4 so as to handle a thrust force in any direction.

Figure 4:
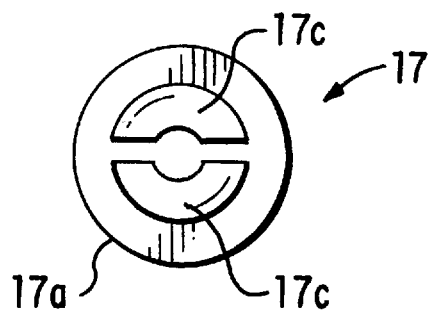
FIG. 4 is a front elevational view of the end spacer of FIG. 3.
Figure 5:
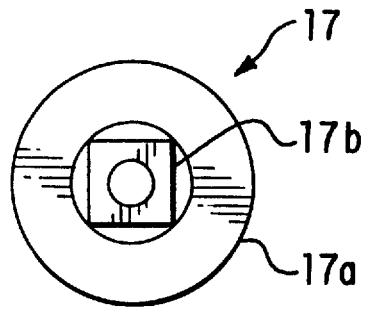
FIG. 5 is a rear elevational view of the end spacer of FIG. 3.
Figure 6:
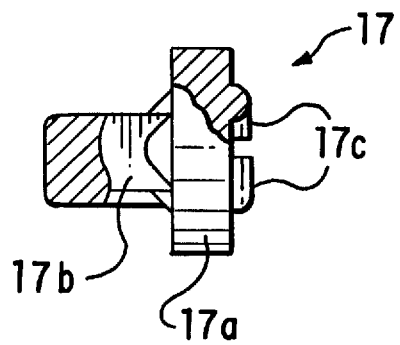
FIG. 6 is a partially broken away sectional view of the end spacer of FIG. 3.

The end spacer 17 is made of a resin having superior heat and abrasion resistance, such as polyimide resin. The end spacer, as shown in FIGS. 4–6, includes a discoid spacer portion 17*a* and a square-pole-type press-fitting portion 17*b* that protrudes from an end face of the spacer portion 17*a*. The end spacer 17 disposed at the root end face of the anti-worm side of the motor shaft 4 communicates with the motor shaft 4 so that it cannot be rotated when the press-fitting portion 17*b* is press-fitted into a press-fitting recess 4*b* that is formed at the root end face at the anti-worm side of the motor shaft 4.

In operation, a reversal force and a thrust force are communicated to the worm 4*a* from the worm wheel 11 when the windowpane is pushed down. The thrust force causes the end spacer 17 to be pressed to the thrust receiving portion. This pressing contact generates a frictional braking force to the reversal force. Heat produced due to friction is transmitted to the yoke 3 side of the apparatus which has a high heat conductivity. The yoke 3 is made of metal and thus is only nominally affected by the frictional heat. An annular protrusion 17*c* is formed at the pressing contact face of the end spacer 17. A braking force is created in accordance with the front end area of the protrusion 17*c*.

The end spacer 17 that is disposed at the worm-side front end face of the motor shaft 4 is set to the speed reduction case 10 side so that it cannot be rotated when the press-fitting portion 17*b* is press-fitted into a square hole 18*a* of a metallic plate 18. The metallic plate 18 is set to the thrust receiving portion 10*b* of the speed reduction case 10 so that it cannot be rotated.

In operation, a reversal force and a thrust force are communicated to the worm 4*a* from the worm wheel 11 when the windowpane is pushed down. The thrust force causes the worm-side front end face of the motor shaft 4 to be pressed to the end spacer 17 at the speed reduction case 10. This pressing contact generates a frictional braking force against the reversal force. Heat produced due to friction is transmitted to the metallic motor shaft 4 which has a higher heat conductivity than the plastic end spacer 17. As a result, it is possible to prevent the plastic speed reduction case 10 from being softened by the frictional heat.

The speed reduction case 10 uses a metallic plate 18 for reinforcement. However, the end spacer 17 could also be directly press-fit into the recess 10*c* formed at the thrust receiving portion 10*b* of the speed reduction case 10.

In the operation of the invention described above, when a windowpane is pushed down, the pushing-down force is communicated to the speed reducing section 9 via the output shaft 13. This force operates on the worm wheel 11 as a reversal force such that the worm 4*a* engaged with the worm wheel 11 is subjected to a reversal force and a thrust force. The motor shaft 4 receives the thrust force and contacts one of the end spacers 17 set at each end of the motor shaft 4. The end spacer 17 produces a frictional braking force to prevent a windowpane from being pushed down.

In accordance with the invention described above, an end spacer 17 for producing a frictional braking force upon receiving a window-glass pushing-down force is provided at each end of the motor shaft 4. The end spacer 17 disposed at the worm-side front end face of the motor shaft 4 is set to the speed reduction case 10 side so that it cannot be rotated. The end spacer 17 produces a frictional braking force and prevents rotation by pressing and contacting the worm-side front end face of the motor shaft 4. Therefore, even if heat is produced due to friction, the heat is transmitted to the motor shaft 4 which has a heat conductivity that is greater than the plastic end spacer 17. Transferring the heat in this manner prevents the plastic speed reduction case 10 from being softened due to the frictional heat.

The above described invention also obviates the formation of a setting hole at the front end of the motor shaft 4, i.e., by setting the end spacer 17 to the worm-side front end face of the motor shaft 4. This obviates the difficult task of framing a setting hole with a small-diameter motor shaft.

Furthermore, the above described invention obviates a metallic plate for preventing abrasion of the thrust receiving portion 10*b* of the speed reduction case 10, i.e., by making the end spacer 17 press and contact the speed reduction case 10 side. Thus, the number of parts is decreased and assembly is simplified.

In accordance with the invention described above, a plastic end spacer friction-brakes the rotation of a motor shaft when the motor shaft receives a thrust force. The plastic end spacer is provided between the thrust receiving portion of a plastic speed reduction case and an end face of the motor shaft. The end spacer is set to the thrust receiving portion of the speed reduction case so that it cannot be rotated. Thus, the end spacer produces a frictional braking force by pressing and contacting the end of the motor shaft. Therefore, even if frictional heat is produced between the end spacer and the motor shaft, the heat is transmitted to the motor shaft which has a high heat conductivity. This minimizes the transmission of frictional heat to the speed reduction case and prevents the speed reduction case from softening.

Moreover, because it is unnecessary to form a setting hole for an end spacer at the front end of a motor shaft, even a small-diameter motor shaft can be used with no problem. Furthermore, pressing the press-fitting portion of the end spacer into the metal plate enables the size of a motor to be smaller.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A motor with a speed reducer, the motor including a rotatable motor shaft having an end face and a threaded portion, the speed reducer including a gear for communicating with the threaded portion of the motor shaft, comprising:

a speed reduction case enclosing at least a part of the speed reducer and including a thrust receiving portion facing the end face of the motor shaft; and an end spacer disposed between the thrust receiving portion of the speed reduction case and the end face of the motor shaft, the end spacer including a press-fitting portion pressingly secured at the thrust receiving portion of the speed reduction case to prevent the end spacer from rotating relative to the speed reduction case, and a protrusion;

whereby a thrust force applied to the motor shaft which is generated by the rotation of the gear caused by an external force presses the end face of the motor shaft to the protrusion of said secured end spacer to friction brake the rotation of the motor shaft caused by the external force.

2. A motor according to claim 1, further including a yoke made of a ferromagnetic metal and enclosing at least a part of the motor.

3. A motor according to claim 1, wherein the speed reduction case is made of synthetic resin.

4. A motor according to claim 1, wherein the end spacer is made of synthetic resin.

5. A motor according to claim 1, further including a plate defining an aperture and secured at the thrust receiving portion of the speed reduction case.

6. A motor according to claim 5, wherein the press-fitting portion of the end spacer is received within the aperture of the plate.

7. A motor according to claim 6, wherein the aperture and a cross-section of the press-fitting portion are shaped in the form of a square.

8. A motor according to claim 7, wherein the plate is made of metal.

9. An apparatus for braking by friction the rotation of a motor shaft of a motor provided with a speed reducer, the motor shaft having an end face and a threaded portion, the speed reducer including a gear for communicating with the threaded portion of the motor shaft, comprising:

means for enclosing at least a part of the speed reducer, the means for enclosing having a thrust receiving portion that faces the end face of the motor shaft;

an end spacer disposed between the thrust receiving portion of the means for enclosing and the end face of the motor shaft, the end spacer including a press-fitting portion and a protrusion; and means for securing the press-fitting portion to prevent the end spacer from rotating relative to the means for enclosing;

whereby a thrust force applied to the motor shaft which is generated by the rotation of the gear caused by an external force presses the end face of the motor shaft to the protrusion of the end spacer to friction brake the rotation of the motor shaft caused by the external force.

10. An apparatus according to claim 9, further including a yoke made of a ferromagnetic metal and enclosing at least a part of the motor.

11. An apparatus according to claim 9, wherein the speed reduction case is made of synthetic resin.

12. An apparatus according to claim 9, wherein the end spacer is made of synthetic resin.

13. An apparatus according to claim 9, further including a plate defining an aperture and secured at the thrust receiving portion of the speed reduction case.

14. An apparatus according to claim 13, wherein the press-fitting portion of the end spacer is received within the aperture of the plate.

15. An apparatus according to claim 14, wherein the aperture and a cross-section of the press-fitting portion are shaped in the form of a square.

16. An apparatus according to claim 15, wherein the plate is made of metal.

17. A method of braking by friction the rotation of a motor shaft of a motor provided with a speed reducer, the motor shaft having an end face and a threaded portion, the speed reducer including a gear for communicating with the threaded portion of the motor shaft, comprising the steps of:

enclosing at least a part of the speed reducer with a speed reduction case, the speed reduction case having a thrust receiving portion that faces the end face of the motor shaft;

preventing an end spacer, disposed between the thrust receiving portion of the speed reduction case and the end face of the motor shaft, from rotating relative to the speed reduction case, by pressingly securing a press-fitting portion of the end spacer; and pressing the end face of the motor shaft to a protrusion of the end spacer when a thrust force is applied to the motor shaft by the rotation of the gear caused by the external force to friction brake the rotation of the motor shaft caused by an external force.

18. The method according to claim 17, wherein the step of preventing an end spacer from rotating includes securing a metal plate that defines an aperture to the thrust receiving portion of the speed reduction case.

19. The method according to claim 18, wherein the step of preventing an end spacer from rotating includes receiving a press-fitting portion of the end spacer in the aperture of the metal plate.

20. The method according to claim 17, further including the step of enclosing the motor in a yoke made of ferromagnetic metal.

* * * * *